(12) United States Patent
Finn

(10) Patent No.: US 8,144,577 B2
(45) Date of Patent: Mar. 27, 2012

(54) TECHNIQUE FOR EFFICIENTLY MANAGING BANDWIDTH REGISTRATION FOR MULTIPLE SPANNING TREE OPTIONS

(75) Inventor: Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 819 days.

(21) Appl. No.: 11/431,428

(22) Filed: May 10, 2006

(65) Prior Publication Data

US 2007/0263554 A1    Nov. 15, 2007

(51) Int. Cl.
*H04L 12/28* (2006.01)
*H04L 1/00* (2006.01)
(52) U.S. Cl. .......................................... 370/229; 370/256
(58) Field of Classification Search .................. None
See application file for complete search history.

(56) References Cited

U.S. PATENT DOCUMENTS

| | | | |
|---|---|---|---|
| 5,394,402 A | 2/1995 | Ross | |
| 5,742,604 A | 4/1998 | Edsall et al. | |
| 6,032,194 A | 2/2000 | Gai et al. | |
| 6,188,694 B1 | 2/2001 | Fine et al. | |
| 6,202,114 B1 | 3/2001 | Dutt et al. | |
| 6,219,739 B1 | 4/2001 | Dutt et al. | |
| 6,262,974 B1 * | 7/2001 | Chevalier et al. | 370/232 |
| 6,388,995 B1 | 5/2002 | Gai et al. | |
| 6,515,969 B1 | 2/2003 | Smith | |
| 6,628,624 B1 | 9/2003 | Mahajan et al. | |
| 6,801,506 B1 | 10/2004 | Dey | |
| 6,813,250 B1 | 11/2004 | Fine et al. | |
| 6,898,189 B1 | 5/2005 | Di Benedetto et al. | |
| 6,934,262 B1 | 8/2005 | Lau et al. | |
| 6,937,576 B1 | 8/2005 | Di Benedetto et al. | |
| 6,944,130 B1 | 9/2005 | Chu et al. | |
| 6,956,821 B2 * | 10/2005 | Szviatovszki et al. | 370/237 |
| 7,328,223 B2 * | 2/2008 | Nakamichi et al. | 1/1 |

(Continued)

OTHER PUBLICATIONS

United States Patent Application Serial No., entitled A Technique for Efficiently Managing Bandwidth for Multipoint-to-Multipoint Services in a Provider Network, by Finn on filed May 10, 2006.

(Continued)

*Primary Examiner* — Marcus R Smith
(74) *Attorney, Agent, or Firm* — Cesari and McKenna, LLP

(57) ABSTRACT

A technique efficiently manages bandwidth (BW) registration for multiple spanning tree options in a computer network. According to the novel technique, an entry bridge determines multiple spanning tree paths to other bridges of the network (namely, one or more available spanning trees rooted at one or more bridges of the network) and determines a utilized (registered) BW on each of those paths. Upon receiving a request to initiate BW registration for a data flow to a destination end point, e.g., from an application source end point, the entry bridge selects one of the spanning tree paths to utilize for the data flow. Selection of the spanning tree path from among the multiple available paths may be based on (i) available bandwidth of the paths, (ii) a shortest of the paths, and (iii) a lowest bridge identifier ID for the bridge root for the path. The entry bridge sends a registration message for the data flow towards the destination end point along the selected spanning tree path. If successful, the data flow is transmitted on the selected path. If not, the entry bridge attempts to register the data flow on a next best alternate spanning tree, e.g., until a successful registration or until a determination that no further alternate spanning trees exist.

22 Claims, 8 Drawing Sheets

U.S. PATENT DOCUMENTS

| | | | |
|---|---|---|---|
| 7,760,738 B1* | 7/2010 | Chamas et al. | 370/395.21 |
| 2005/0063321 A1* | 3/2005 | Imai | 370/256 |
| 2005/0152289 A1* | 7/2005 | Nagata et al. | 370/256 |
| 2006/0007867 A1* | 1/2006 | Elie-Dit-Cosaque et al. | 370/241.1 |
| 2006/0203745 A1* | 9/2006 | Acharya et al. | 370/254 |
| 2006/0268747 A1* | 11/2006 | van Haalen et al. | 370/256 |

OTHER PUBLICATIONS

U.S. Appl. No. 11/182,564, entitled Methods and Devices for Improving the Multiple Spanning Tree Protocol, by Finn on Jul. 14, 2005.

U.S. Appl. No. 11/228,162, entitled System and Method for Generating Symmetrical Spanning Trees, by Tallet, et al. on Sep. 16, 2005.

Moy, J., Network Working Group, Request for Comments 2328, entitled OSPF Version 2, Apr. 1998, pp. 1-204.

Callon, R., Network Working Group, Request for Comments 1195, entitled Use of OSI IS-IS for Routing in TCP/IP and Dual Environments, Dec. 1990, pp. 1-80.

Malkin, G., Network Working Group, Requets for Comments 1723, entitled RIP Version 2—Carrying Additional Information, Nov. 1994, pp. 1-9.

IEEE P802.1ak/D5.1, Draft Standard for Local and Metropolitan Area Networks, Virtual Bridged Local Area Networks—Amendment 07: Multiple Registration Protocol, IEEE, Mar. 30, 2006, pp. 1-107.

IEEE Std. 802.1D, 1998 Edition, Information Technology—Telecommunications and Information Exchange Between Systems—Local and Metropolitan Area Networks—Common Specifications—Part 3: Media Access Control (MAC) Bridges, IEEE, 1998, pp. 1-355.

IEEE Std. 802.1D—2004, IEEE Standard for Local and Metropolitan Area Networks—Media Access Control (MAC) Bridges, IEEE, Jun. 2004, pp. 1-269.

IEEE Std. P802.1Q-Rev/D5.0, Draft Standard for Local and Metropolitan Area Networks—Virtual Bridged Local Area Networks—Revision, IEEE Sep. 2005.

Perlman, R. et al., [rbridge] How Many Spanning Trees?, (internet newsgroup posting), (http://www.postel.org/pipermail/rbridge/2005-June/000352.html), Jun. 28, 2005, pp. 1-3.

Seaman, Mick, Multiple Symmetric Spanning Trees, Revision 0.3, Mar. 9, 2005, pp. 1-4.

Internetworking Technologies Handbook No. 1-58705-001-3, Chapter 23 entitled Transparent Bridging, Cisco Press, pp. 23-1 through 23-8.

Virtual Bridged Local Area Networks; IEEE Std 802.1Q, 2003 Edition, IEEE, pp. 183-184 and 209.

U.S. Appl. No. 11/182,564, entitled Methods and Devices for Improving the Multipple Spanning Tree Protocol, By Normal Finn, on Jul. 14, 2005.

PCT Notification of Transmittal of the International Search Report and the Written Opinion of the International Searching Authority, or the Declaration, International Application No. PCT/US07/11101, International Filing Date: May 8, 2007, Date of Mailing: May 30, 2008, 7 pages.

* cited by examiner

TECHNIQUE FOR EFFICIENTLY MANAGING BANDWIDTH REGISTRATION FOR MULTIPLE SPANNING TREE OPTIONS

CROSS-REFERENCE TO RELATED APPLICATIONS

The present invention is related to commonly-owned copending U.S. application Ser. No. 11/182,564, entitled METHODS AND DEVICES FOR IMPROVING THE MULTIPLE SPANNING TREE PROTOCOL, filed by Finn on Jul. 14, 2005, the contents of which are incorporated by reference in its entirety.

The present invention is also related to commonly-owned copending U.S. application Ser. No. 11/228,162 entitled SYSTEM AND METHOD FOR GENERATING SYMMETRICAL SPANNING TREES, filed by Tallet et al. on Sep. 16, 2005, the contents of which are incorporated by reference in its entirety.

The present invention is further related to commonly-owned copending U.S. application Ser. No. 11/431,429, entitled A TECHNIQUE FOR MANAGING BANDWIDTH FOR MULTIPOINT-TO-MULTIPOINT SERVICES, filed by Finn on even date herewith, the contents of which are incorporated by reference in its entirety.

BACKGROUND OF THE INVENTION

1. Field of the Invention

The present invention relates to computer networks and more particularly to efficiently managing bandwidth (BW) registration for multiple spanning tree options in a computer network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as a trunk ports, whereas ports used to couple bridges to end stations are generally referred to as access ports. The bridging function includes receiving data from a sending entity at a source port and transferring that data to at least one destination port for forwarding to one or more receiving entities.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE promulgated a standard (IEEE Std. 802.1D-1998™) that defines a spanning tree protocol to be executed by 802.1D compatible devices. In general, by executing the 802.1D spanning tree protocol, bridges elect a single bridge within the bridged network to be the "Root Bridge". The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Virtual Local Area Networks

A computer network may also be segmented into a series of logical networks. For example, U.S. Pat. No. 5,394,402, issued Feb. 28, 1995 to Ross (the "'402 patent"), discloses an arrangement for associating any port of a switch with any particular network segment. Specifically, according to the '402 patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-2005 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Multiple Spanning Tree Protocol

Within the IEEE Std. 802.1Q-2005, the IEEE also included a specification standard for a Spanning Tree Protocol that is specifically designed for use with networks that support VLANs. The Multiple Spanning Tree Protocol (MSTP), which is described in the IEEE Std. 802.1Q-2005, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-2005 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE Std. 802.1Q-2005 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined within the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include both a settable priority component and a system ID extension. The system ID extension corresponds to the CIST or one of the MSTI IDs. The MSTP compatible bridges within a given Region will thus have a different bridge ID for the CIST and each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual VLAN to MSTI tables in their BPDUs. Instead, the MST BPDUs carry only a digest of the VLAN to MSTI table or mappings. The digest is generated by applying the well-known MD-5 algorithm to the VLAN to MSTI table. When a bridge receives an MST BPDU, it extracts the MST Configuration ID contained therein, including the digest, and compares it with its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

Registration Protocols

IEEE Std. 802.1p (now incorporated within IEEE 802.1D-2004) outlines the implementation of the Generic Attribute Registration Protocol (GARP) and related GARP applications which allow end stations and bridges to exchange membership information in a generic manner. In particular, GARP, as defined by IEEE 802.1p, "provides a generic attribute dissemination capability that is used by participants in GARP Applications (GARP Participants) to register and de-register attribute values with other GARP Participants within a Bridged LAN." One application of GARP defined in IEEE 802.1p is the GARP Multicast Registration Protocol (GMRP), which allows GARP participants to join and leave multicast MAC (Media Access Control) address groups. The participant (e.g., an end station) who wishes to join a particular group registers with another GARP participant (e.g., a bridge) that is accepting registrations. This GARP participant (bridge) then applies for membership on behalf of the original participant (end station), which is propagated throughout the network. The information propagated by GMRP generally comprises the multicast MAC address. Another GARP application defined in IEEE 802.1p is the GARP VLAN Registration Protocol (GVRP). GVRP allows a participant to join and leave particular VLANs in a similar manner as GMRP, but involving VLAN membership information, e.g., VLAN IDs (VIDs), as defined in IEEE 802.1Q.

Generally, a GARP participant is responsible for handling GARP state machines and BPDU distribution. A participant in a multiport device (e.g., bridge/switch) that receives a registration for a particular attribute on a port declares (advertises) the attribute through the applicants on all of the other ports participating in GARP. The mechanism for propagating this information from one GARP participant to another within the same device is called GARP Information Propagation (GIP). A GIP context refers to the group of GARP participants belonging to a GIP. For each GIP context, there exists one GARP participant for each GARP application that is enabled on that port (e.g., one participant for each VLAN on that port in GMRP, and one participant for each port in GVRP). Each GARP participant may have both application-specific behavior and the GARP Information Declaration (GID) component, which may comprise, inter alia, one or more attribute values. An attribute is the application-specific information that is being propagated by GARP; e.g., a group MAC addresses and service requirements for GMRP, VIDs for GVRP, etc.

Notably, in addition to the GARP application protocols, IEEE 802.1p also explains how to utilize a tagging scheme to allow frames to be tagged with priority information and an optional VID. The prioritization operates at the MAC layer of the traffic, and classifies (groups) traffic into separate traffic classes. Eight classes are defined by IEEE 802.1p, which are to be configured manually by network administrators (the IEEE has made broad recommendations), and registered throughout the network. Illustratively, the highest priority is seven, which, for example, may be assigned to network-critical traffic, such as Routing Information Protocol (RIP) and Open Shortest Path First (OSPF) updates. Values five and six may be used for delay-sensitive applications such as interactive video and voice, while data classes four through one range from controlled-load applications such as streaming multimedia and business-critical traffic down to "loss eligible" traffic. The zero value is used as a best-effort default, which may be invoked automatically when no other value has been set.

A new IEEE project, P802.1ak (Draft 5.1), identifies the Multiple Registration Protocol (MRP) standard for use with registrations (officially entitled the "Standard for Local and Metropolitan Area Networks Virtual Bridged Local Area Networks—Amendment 07: Multiple Registration Protocol"). MRP, an update (or replacement) to GARP, allows participants in an MRP Application to register attributes with other participants in a bridged LAN. A Multiple VLAN Registration Protocol (MVRP) is defined within IEEE P802.1ak to communicate topology changes for each VLAN independently of the spanning tree supporting the VLAN (e.g., an update to GVRP). This allows multiple VLANs to use a single spanning tree without requiring a bridge to relearn addresses for a given VLAN when a topology change does not change the bridge ports used to reach end stations receiving frames for that VLAN, as will also be understood by those skilled in the art. A Multiple Multicast Registration Protocol (MMRP) is also defined that updates GMRP in a similar manner. Those skilled in the art will understand that the MRP update allows for reduced fault recovery time (convergence time) and reduced disruption of traffic in a very large network due to a topology change in a small portion of that network.

Service Bandwidth Considerations

Customers (users) often desire to send traffic across a provider network (e.g., a bridged network) to other customers. The traffic or data "flows" enter the provider network from a source customer, e.g., at a User-Customer Interface (UNI) of an "entry bridge," and traverse nodes (e.g., bridges) of the provider network to reach the destination customer of the flow, e.g., at a remote UNI (and "exit bridge"). Notably, if one provider network is attached to another provider network, the networks may be attached by Network Node Interfaces (NNIs). These customer-to-customer or "point-to-point" (P2P) transmissions (services) may require the use of a certain amount of bandwidth (BW) to transmit the data. "Multipoint-to-Multipoint" (MP2MP) services, on the other hand, are services in which any number of multiple points (e.g., customers) can transmit and receive data flows across the network to/from any number of other multiple points (i.e., more than two UNIs).

In some instances, it is desirable to guarantee or reserve the BW required for the transmission along the path of the data flow between points (a "conversation"), e.g., according to a particular spanning tree, to ensure that the traffic flowing between the points has enough BW. Otherwise, traffic may be dropped or suspended due to excess traffic along the path, e.g., due to other flows or conversations. For example, "Audio Visual Bridging" (AVB) is used to describe the technology associated with connecting video and audio components, e.g., set-top boxes, radios, etc., to a bridged network (e.g., an Ethernet). The data flows in AVB (or "streams") may require a certain quality of service (QoS) to operate effectively, such as requiring a certain amount of BW for the stream, as well as requirements for latency, jitter, etc. Applications running the AVB services may request that the BW be reserved (registered) across the network (i.e., from the source to the destination) for the particular services, so that the transmission is guaranteed to be functional (i.e., has enough BW).

The use of spanning trees, as described above and as will be understood by those skilled in the art, has many useful applications. However, many customer devices (e.g., executing AVB services) often have multiple connections to the network. For example, redundant connections may interconnect a single device to the network, multiple application instances (e.g., one for audio, one for video, one for data, etc.) may be located on a single customer device, etc. By using a single spanning tree to connect the source customer to one or more destination customers, there is only one path between each end point. As such, all data flows from the source customer utilize the single spanning tree path, which may cause critical links to become saturated with traffic. This, in turn, may increase the difficulty of meeting the BW requirements of the services, as well as limit the number or quality of application services that may be used by the customers.

Spanning trees can be created by methods other than those described in IEEE Std. 802.1D-2004 or 802.1Q-2005. Those skilled in the art commonly recognize two principle classes of algorithms used to compute the paths over which data packets are to be forwarded: link state algorithms, and distance vector algorithms. Example link state algorithms include, e.g., the Open Shortest Path First (OSPF) protocol, described in Request for Comment (RFC) 2328, entitled OSPF Version 2, dated April 1998, and the Intermediate-System-to-Intermediate-System (IS-IS) protocol, described in RFC 1195, entitled *Use of OSI IS-IS for routing in TCP/IP and Dual Environments*, dated December 1990, both of which are hereby incorporated by reference. Also, example distance vector algorithms include, e.g., the Routing Information Protocol (RIP), described in RFC 1723, entitled *RIP Version 2*, dated November 1994, and MSTP (IEEE Std. 802.1Q-2005). As described in the above-incorporated commonly-owned copending U.S. application Ser. No. 11/182,564, entitled METHODS AND DEVICES FOR IMPROVING THE MULTIPLE SPANNING TREE PROTOCOL, and Ser. No. 11/228,162, entitled SYSTEM AND METHOD FOR GENERATING SYMMETRICAL SPANNING TREES, the spanning trees commonly computed using MSTP can also be computed using link state algorithms. As used herein, this technique is referred to as "Optimal Bridging."

In both classes of algorithms, bridges transmit and receive information among each other in update packets (or BPDUs) in order to create the spanning trees. Unlike the distance vector algorithms, the link state algorithms supply each bridge with the information needed for that bridge to compute a model of the current topology of the network, including every bridge and every LAN.

In many cases, the network connecting the source and destination end points may have multiple paths between them, e.g., possibly connected to the multiple connections of the customer devices. However, even where some of those multiple paths have available resources (e.g., BW), they are generally unavailable to the customers because of the single spanning tree configuration. What this means, then, is that if the single spanning tree used by an entry bridge for a customer device has no available resources, the customer device is unable to satisfy its QoS requirements (e.g., BW), regardless of whether another path exists over the network to the destination(s).

There remains a need, therefore, for a technique that efficiently manages BW registration for the multiple paths across the network. In particular, a need exists for bridges of the network to optimally utilize available resources of the network, regardless of whether the available resources are on the single (primary) spanning tree used by the bridge. At the same time, however, conventional spanning tree techniques should be maintained in order to achieve the benefits of spanning trees (e.g., loop-free environments, etc.).

SUMMARY OF THE INVENTION

The present invention is directed to a technique for efficiently managing bandwidth (BW) registration for multiple spanning tree options in a computer network. According to the novel technique, an entry bridge determines multiple spanning tree paths to other bridges of the network (namely, one or more available spanning trees rooted at one or more bridges of the network) and determines a utilized (registered) BW on each of those paths. Upon receiving a request to initiate BW registration for a data flow to a destination end point, e.g., from an application source end point, the entry bridge selects one of the spanning tree paths to utilize for the data flow. Selection of the spanning tree path from among the multiple available paths may, e.g., be based on, in order, (i) available bandwidth of the paths, (ii) a shortest of the paths, and (iii) a lowest bridge identifier ID for the bridge root for the path.

The entry bridge sends a registration message for the data flow towards the destination end point along the selected spanning tree path. If the registration is successful, the data flow is transmitted over the selected path. Particularly, the entry bridge may either inform the source end point of which spanning tree to use, e.g., using a virtual local area network (VLAN) identifier (VID), or may detect the data flow and direct the traffic over the selected spanning tree itself. Notably, if the selected spanning tree path is not rooted at the entry bridge, i.e., is not on a primary spanning tree but rather an alternate spanning tree, bridges along the path (e.g., the entry bridge up to an exit bridge) may utilize special forwarding (i.e., separate and apart from conventional forwarding) for the traffic that, e.g., utilizes the VID to indicate a primary or alternate spanning tree. If, on the other hand, the registration fails, the entry bridge may attempt to register the data flow on a next best alternate spanning tree, e.g., until a successful registration or until a determination that no further alternate spanning trees exist.

Advantageously, the novel technique efficiently manages BW registration for multiple spanning tree options in a computer network. By monitoring the BW utilization (registration) of multiple spanning tree paths, the novel technique allows an entry bridge to determine the best spanning tree to utilize when transmitting a data flow. In particular, by allowing the entry bridge to select any one of the available multiple spanning trees based on BW utilization, the present invention provides greater opportunity for an entry bridge to register BW for a data flow in the event a primary spanning tree rooted at the entry bridge is congested or otherwise unavailable. Also, the dynamic nature of the novel technique alleviates the need for cumbersome manual configuration, and does not require a master network BW allocation facility.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
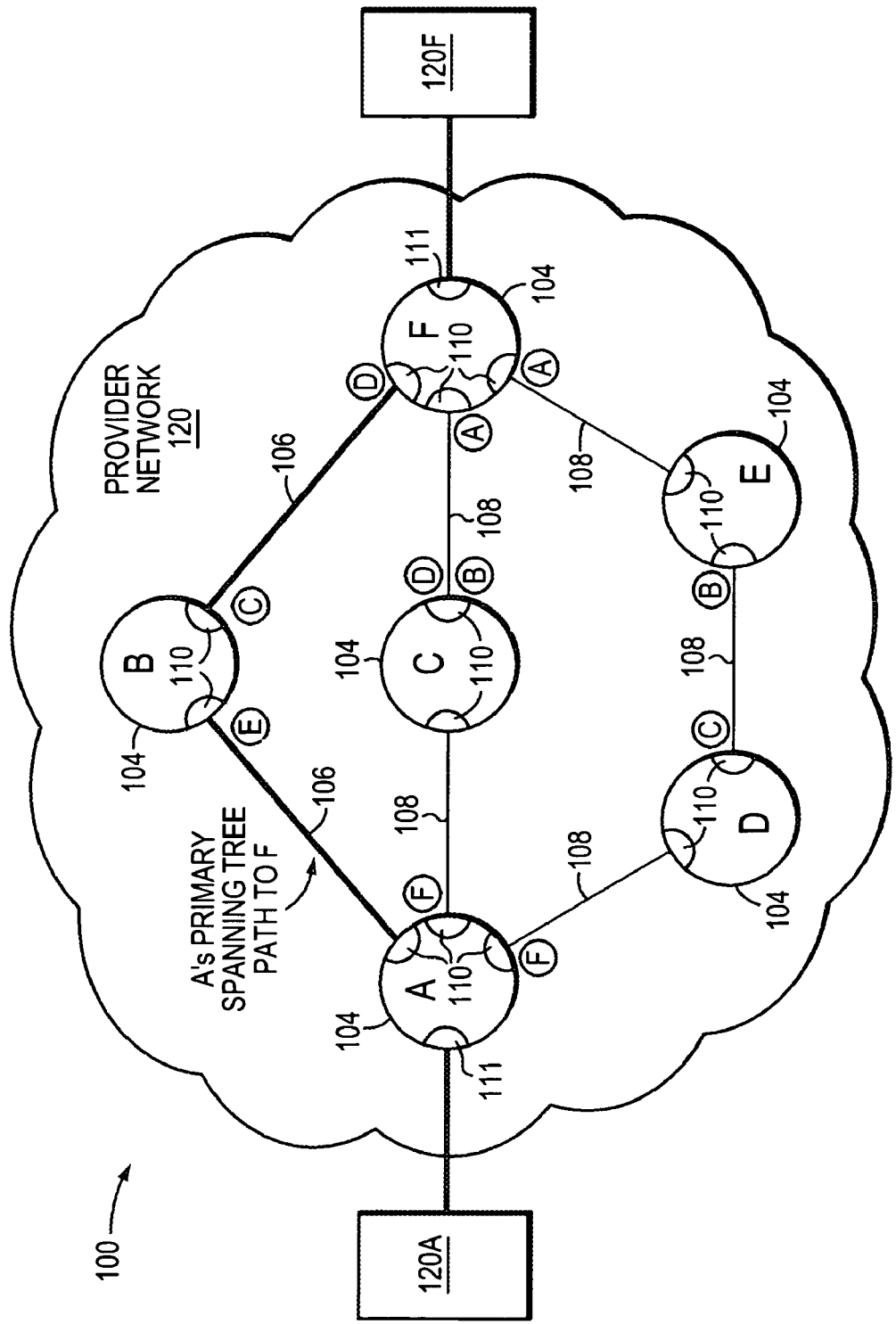
FIG. 1 is a highly schematic illustration of a computer network in accordance with the present invention.

FIG. 1 is a highly schematic illustration of a computer network 100 in accordance with the present invention. Network 100 includes a provider network 120 having a plurality of interconnected intermediate network devices 104 which, illustratively, are bridges (e.g., Bridges A-F). The bridges are attached to each other and to end stations 102 (e.g., 102A and 102F) by a plurality of local area networks (LANs) 106/108. The bridges 104 are interconnected by a plurality of LANs 106/108, which may comprise shared media or point-to-point links/segments.

Each bridge 104 has a plurality of ports 110 (and 111) for receiving and forwarding messages across the network 100. The ports of each bridge 104, moreover, may be identified, e.g., by port numbers, such a Port 0 (P0), Port 1 (P1), Port 2 (P2), etc., so that the entities that can be reached by a respective bridge can be associated with the particular port used to reach them. Bridge ports 111 that are coupled to LANs connected only to end stations, and not to other bridges, are referred to as "access ports" or User-Network Interface (UNI) ports. The bridges having UNI Ports 111 are referred to herein as "entry bridges" or "exit bridges" that provide entry into or exit out of the network for the customers. Bridge ports 110 that connect via a LAN 106/108 to another intermediate network device, e.g., to a neighboring bridge, are referred to as "trunk ports."

It should be understood that the network 100 of FIG. 1 is meant for illustrative purposes only, and that the present invention will operate with other networks having simpler or possibly far more complex topologies.

As shown, network 100 includes a plurality of loops. Execution of a spanning tree protocol, such as the Spanning Tree Protocol (STP) defined in IEEE Std. 802.1D-2004, prevents loops by defining a loop-free topology (i.e., an active topology) in the bridged network 100. As an example, the LANs (segments) identified as bold lines (106) are LANs of an illustrative spanning tree path (along the active topology) of Bridge A to reach Bridge F, while the other lines (108) are LANs not along the path to Bridge F, as will be understood by those skilled in the art. Conventionally, a network 100 has a single spanning tree shared by all bridges 104 of the network. However, the use of multiple spanning trees in the network 100, e.g., the Multiple Spanning Tree Protocol (MSTP), which is described in the IEEE Std. 802.1Q-2005, describes the use of multiple spanning trees for use within the network. In particular, the optimized MSTP ("Optimal Bridging") as used in accordance with the present invention are described in detail further below.

Figure 2:
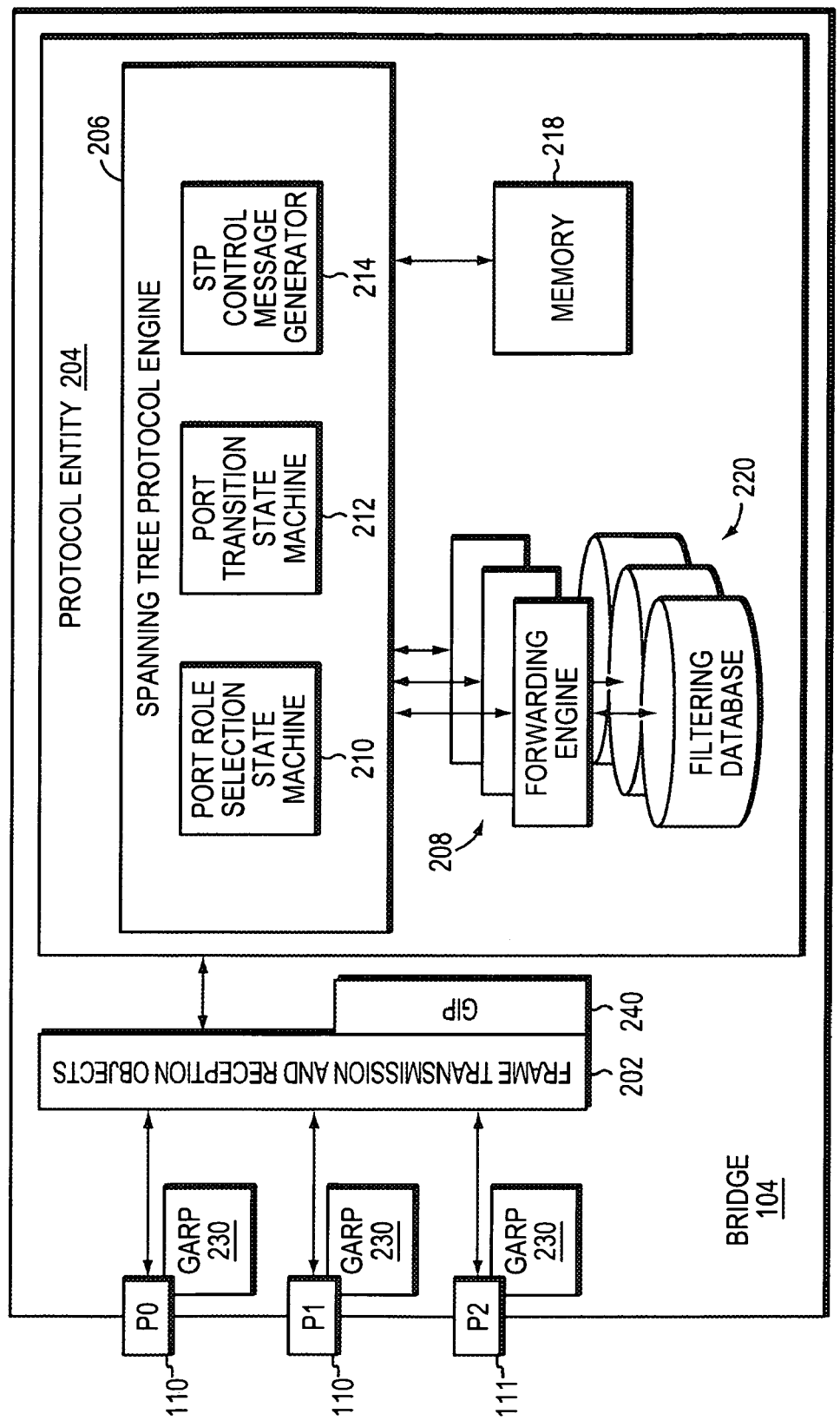
FIG. 2 is a partial block diagram of an exemplary bridge that may be used in accordance with the present invention.

FIG. 2 is a partial block diagram of an exemplary bridge 104. As indicated above, the bridge has a plurality of ports 110/111, each of which is preferably identified by a number (e.g., P0-P2). One or more frame transmission and reception objects, designated generally 202, are associated with the ports 110/111 such that network messages, including data frames, received at a given port, e.g., P1, may be captured, and frames to be transmitted by bridge 104 may be delivered to a given port, e.g., P2. Frame reception and transmission objects 202 are preferably message storage structures, such as priority queues.

Bridge 104 further includes at least one protocol entity 204 that is in communicating relationship with the frame transmission and reception objects 202, and that comprises a plurality of components. In particular, the protocol entity 204 includes at least one spanning tree protocol (STP) engine 206 and one or more forwarding engines 208. The STP engine 206 preferably comprises a plurality of subcomponents, such as, inter alia, a port role selection state machine 210, a port transition state machine 212, and a STP control message generator 214. The STP engine 206 constructs a set of spanning tree instances, one for each bridge in the network. These spanning tree instances are created in a manner similar to that in IEEE Std. 802.1Q-2005, which is hereby incorporated by reference in its entirety, except that link state information is used, instead of distance vector information, as described in above-incorporated commonly-owned copending U.S. application Ser. No. 11/182,564, entitled METHODS AND DEVICES FOR IMPROVING THE MULTIPLE SPANNING TREE PROTOCOL, and Ser. No. 11/228,162, entitled SYSTEM AND METHOD FOR GENERATING SYMMETRICAL SPANNING TREES. The STP engine 206 includes or is in communicating relationship with a memory 218, which may be a volatile and/or non-volatile random access memory (RAM) or some other memory device. Memory 218 is preferably organized to include a plurality of records or cells (not shown) for storing spanning tree related information or parameters, such as the bridge's numeric bridge identifier (ID), the registered values for each port P0-P2, etc.

The one or more forwarding engines 208 are preferably coupled to one or more filtering databases 220 that stores address information corresponding to the entities of network 100 (FIG. 1). Each filtering database preferably has a plurality of records (not shown) each containing a plurality of cells, including a destination address cell, a destination port cell and a corresponding timer cell. Each record in the filtering databases 220 preferably corresponds to a particular network entity.

The forwarding engines 208 are configured to switch or bridge messages, such as packets and/or frames, from a source port 110 to one or more destinations ports 110 depending on information contained in the appropriate filtering database 220, and also depending on the spanning tree port states of the respective ports 110, as managed by STP engine 206. The forwarding engines 208 are also in communicating relationship with the STP engine 206, and may relay STP control messages, such as registration (e.g., GARP) protocol data unit (PDU) messages, received at ports 110 thereto.

Figure 3:
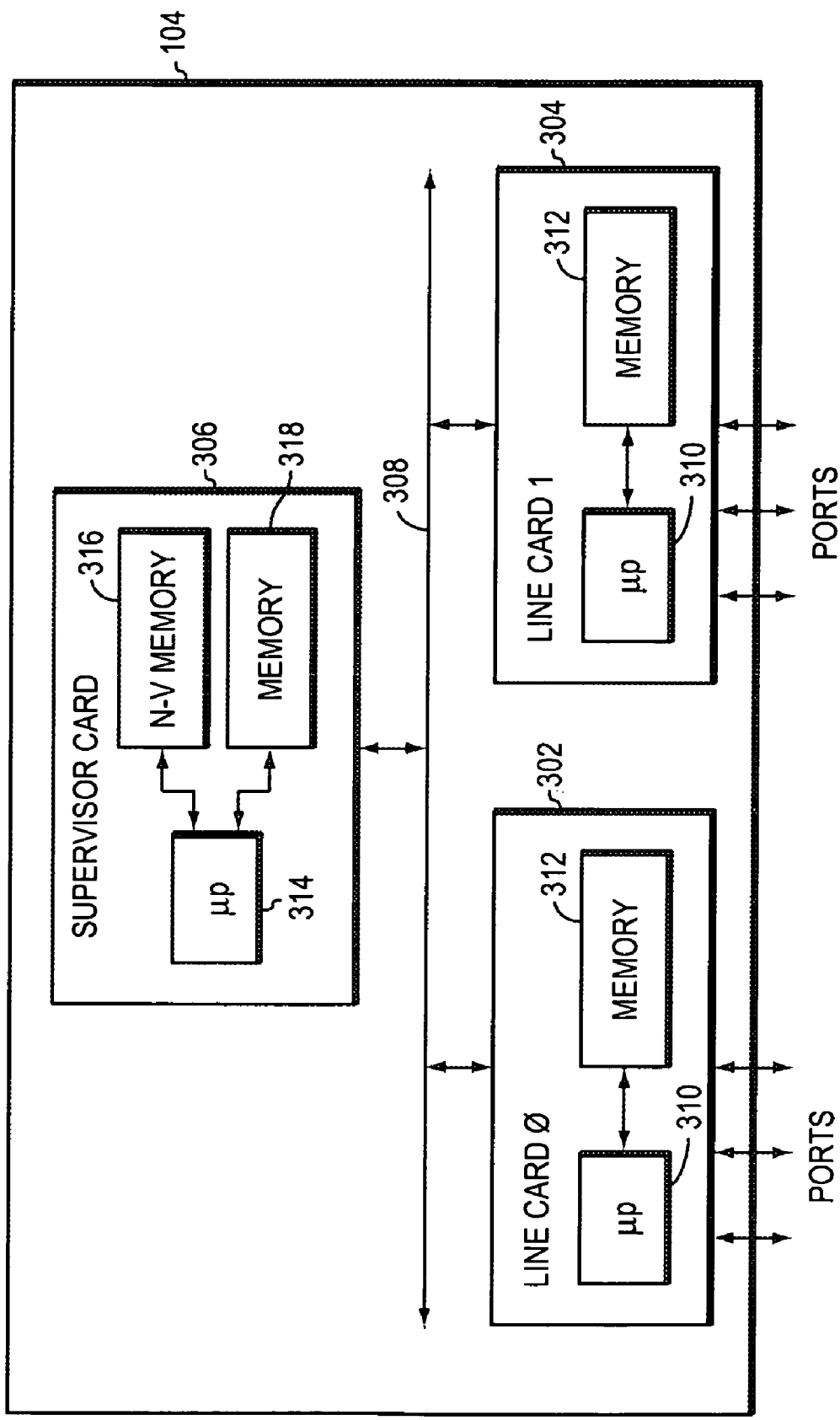
FIG. 3 is another highly schematic, partial block diagram of a bridge that may be used in accordance with the present invention.

In the illustrated embodiment, bridge 104 includes transmitting and receiving circuitry, including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 3 is another highly schematic, partial block diagram of bridge 104 illustrating such components. As shown in FIG. 3, bridge 104 includes a plurality of line cards 302 and 304, and a supervisor card 306. Cards 302, 304 and 306 are in communicating relationship with each other through a communication bus 308. Each of the line cards 302 and 304 includes a microprocessor (μP) 310 and at least one memory 312. The supervisor card 306 also includes a μP 314, as well as both a non-volatile (N-V) memory 316 and a volatile memory 318, e.g., RAM.

Referring again to FIG. 2, it will be understood by those skilled in the art that STP engine 206 and forwarding engines 208 may each comprise registers and combinational logic configured and arranged to produce sequential logic circuits. In the illustrated embodiment, engines 206 and 208 are preferably software modules or libraries containing program instructions pertaining to the methods described herein and executable by one or more processing elements, such as the microprocessors 310 and/or 314 (FIG. 3), of bridge 104. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention include, but are not limited to, the commercially available series of switches from Cisco Systems, Inc. of San Jose, Calif., such as the Catalyst 6500, 7600, 3500, and GRS.

As mentioned above, the IEEE developed the Generic Attribute Registration Protocol (GARP) in IEEE Std. 802.1D, 1998 edition. As its name implies, GARP provides a framework that allows participants to make and withdraw declarations for generic attributes. In response to a GARP declaration, other network participants register the parameter value(s) of the specified attribute at the port on which the declaration was received. GARP participants also propagate declarations so that other participants in the network can make appropriate registrations. Participants can also withdraw their previous declarations. In response to a withdrawal, the other participants de-register the particular parameter value(s).

Figure 4:
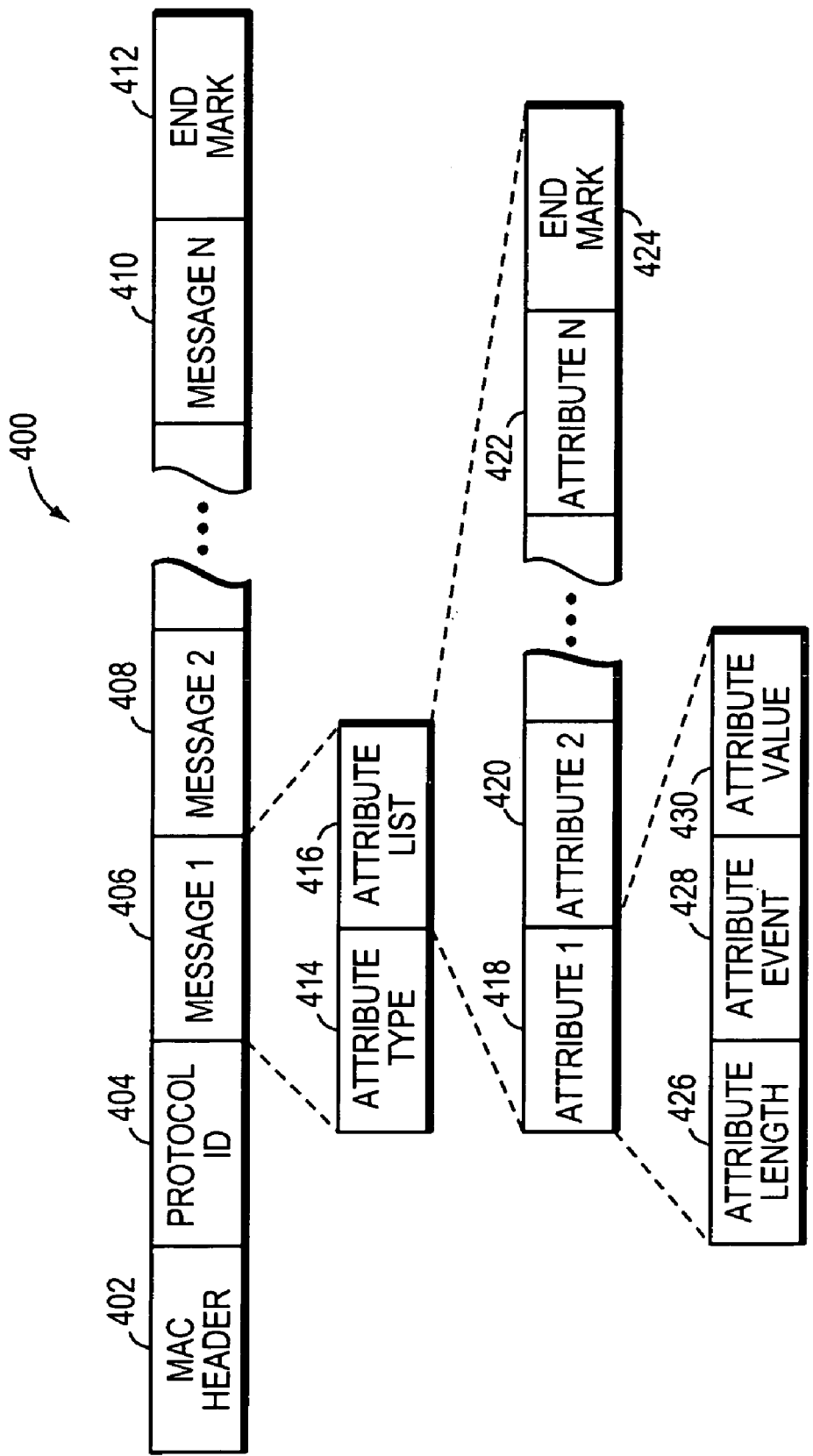
FIG. 4 is a schematic block diagram of a conventional registration PDU message that may be used in accordance with the present invention.

A GARP participant comprises a GARP application component and a GARP Information Declaration (GID) component. The GID component comprises a set of state machines that define the current registration and declaration state for all attribute values. A GARP participant is typically established for each port per GARP application. Thus, for intermediate devices, which often have multiple ports, multiple GARP participants are established (230, FIG. 2). To make or withdraw declarations, GARP participants generate and send special messages called GARP Protocol Data Unit (GARP PDU) messages. FIG. 4 is a schematic block diagram of a conventional GARP PDU message 400. Those skilled in the art will understand that while a GARP PDU message 400 is shown, that other registration messages (e.g., Multiple Registration Protocol, MRP PDU messages) may also be utilized with the present invention. The illustrative registration message 400 typically includes a Media Access Control (MAC) header 402 that includes destination and source address fields, among other information, a protocol identifier (ID) field 404, a plurality of message fields, such as message fields 406, 408 and 410, and an end mark field 412. Each message field, moreover, includes an attribute type field 414 and an attribute list field 416. The attribute list field 416, in turn, includes one or more attribute fields, such as attribute fields 418, 420 and 422, and an end mark field 424.

Each attribute field, such as field 418, includes a 1-byte attribute length field 426, a 1-byte attribute event field 428 and a variable length attribute value field 430.

In order to exchange information among the GARP participants disposed within a given intermediate device, a separate component, called the GARP Information Propagation (GIP) component (240, FIG. 2), is used. The GIP component operates over a GIP context that is established at the intermediate device and defines the ports that are to be included in the given context. That is, although registration can occur at any port, the propagation of that registration only follows the associated GIP context. For example, a GIP context may comprise the ports that belong to the active topology (i.e., all ports in the forwarding spanning tree state). Because blocked ports are not part of the GIP context, a declaration received on a blocked port is not propagated to any other ports, although it is still registered at the blocked port. In contrast, a declaration received at a port is that is in the forwarding spanning tree state is both registered at that port and propagated throughout the GIP context (i.e., to all of the other ports that are in the forwarding state).

As an example of registration attribute propagation, in order to limit the transmission of broadcasts, multicasts and unicast floods associated with a given VID, the IEEE specified an application based on GARP to disseminate VLAN membership information across computer networks. This application, which has been standardized by the IEEE, is known as the GARP VLAN Registration Protocol (GVRP). See IEEE Std. 802.1Q-2005 specification standard. According to GVRP, a bridge starts with the list of VLANs assigned to its access ports. All broadcasts, multicasts and flooded unicasts associated with these listed VLANs need to be received at the bridge. GVRP provides a mechanism for bridges to transmit their lists to the other bridges in order to register these VLANs at the other bridges' trunk ports. Specifically, the bridge generates a GARP PDU message 400 that has an attribute structure, i.e., fields 426, 428 and 430 for each VLAN in the bridge's list of VLANs. The bridge transmits the GARP PDU message 400 from each of its trunk ports. The GARP PDU messages 400 are received on the trunk ports of neighboring bridges. Assuming the GARP PDU message 400 is received on a port in the forwarding spanning tree port state, the receiving bridge registers the list of the VLANs contained in the GARP PDU at all of its other ports that are also in the forwarding state, and not just on the port at which the GARP PDU message 400 was received. The neighboring bridge then generates and transmits GARP PDU messages 400 of its own that list both the VLANs associated with the neighboring bridge's access ports, and the VLANs that were registered as a result of having received a GARP PDU message from the original bridge. If a GARP PDU message is received at a port that is in the blocking spanning tree port state, the VLANs contained in the GARP PDU message are registered at that blocked port, but they are not registered at any other bridge port nor are they used in GARP PDU messages sent by the bridge. Notably, other registered attributes may be distributed throughout the network in a similar manner to VLAN registrations, as will be understood by those skilled in the art and illustratively applied to the present invention described herein.

Figure 5:
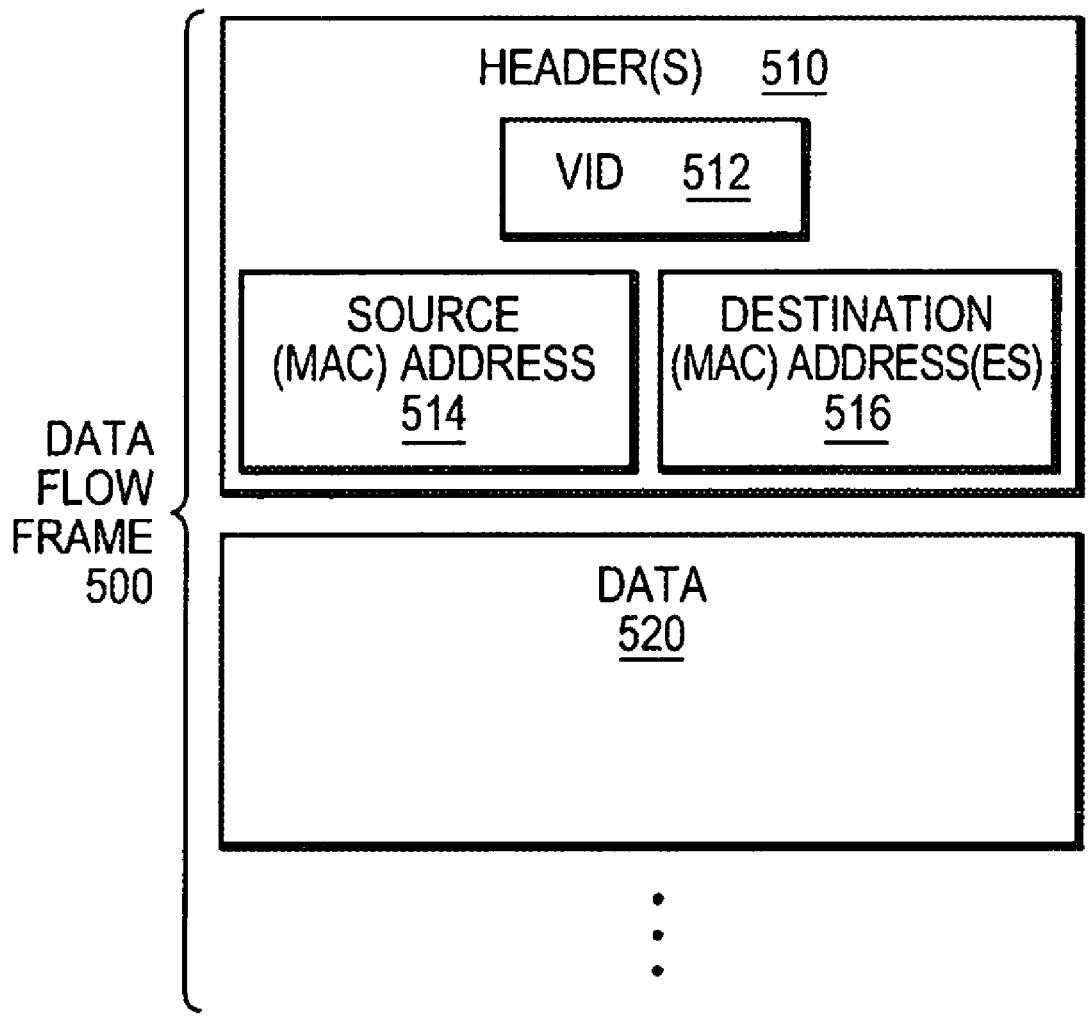
FIG. 5 is a schematic block diagram of an exemplary data flow frame that may be used in accordance with the present invention.

Data flows or "streams" associated with one or more applications (e.g., video, audio, data, etc.) traverse the network from a source end point (or end station), e.g., 102A, to a destination end point, e.g., 102F. FIG. 5 is a schematic block diagram of an exemplary data flow frame 500 that may be used in accordance with the present invention. Illustratively, the data flow frame 500 is embodied as a TCP/IP data packet, but those skilled in the art will understand that other suitable network transmission formats (e.g., ATM frames, etc.) may be used in accordance with the present invention. The frame 500 includes one or more headers 510 (e.g., Layer 2, Layer 3, IP/ATM headers, etc., as will be understood by those skilled in the art), and a data field 520. Source address 514 (e.g., a MAC address) and destination address 516 (e.g., one or more MAC addresses) within the header 510 are the network addresses for the sending device (102A) and the receiving device(s) (102F), respectively. A VID field 512 (e.g., a VID field in a Q-tag, as will be understood by those skilled in the art) contains a value representative of a VLAN (spanning tree instance) that is to be used when forwarding the frame 500, e.g., in accordance with the present invention as described herein. The data content of the data field 520 of the frame is generally a proprietary matter, since the sending device sends the data to a receiving device configured to interpret the specific data according to one or more applications (e.g., video, audio, etc.).

The present invention is directed to a technique for efficiently managing bandwidth (BW) registration for multiple spanning tree options in a computer network. According to the novel technique, an entry bridge determines multiple spanning tree paths to other bridges of the network (namely, one or more available spanning trees rooted at one or more bridges of the network) and determines a utilized (registered) BW on each of those paths. Upon receiving a request to initiate BW registration for a data flow to a destination end point, e.g., from an application source end point, the entry bridge selects one of the spanning tree paths to utilize for the data flow. Selection of the spanning tree path from among the multiple available paths may, e.g., be based on, in order, (i) available bandwidth of the paths, (ii) a shortest of the paths, and (iii) a lowest bridge identifier ID for the bridge root for the path.

The entry bridge sends a registration message for the data flow towards the destination end point along the selected spanning tree path. If the registration is successful, the data flow is transmitted over the selected path. Particularly, the entry bridge may either inform the source end point of which spanning tree to use, e.g., using a VID, or may detect the data flow and direct the traffic over the selected spanning tree itself. Notably, if the selected spanning tree path is not rooted at the entry bridge, i.e., is not on a primary spanning tree but rather an alternate spanning tree, bridges along the path (e.g., the entry bridge up to an exit bridge) may utilize special forwarding (i.e., separate and apart from conventional forwarding) for the traffic that, e.g., utilizes the VID to indicate a primary or alternate spanning tree. If, on the other hand, the registration fails, the entry bridge may attempt to register the data flow on a next best alternate spanning tree, e.g., until a successful registration or until a determination that no further alternate spanning trees exist.

In accordance with the present invention, an entry bridge (e.g., Bridge A) determines multiple spanning tree paths to other bridges of the network (illustratively, to exit bridge F). In particular, the multiple spanning tree paths may be created using techniques as described in detail in above-incorporated commonly-owned copending U.S. Application Ser. No. 11/182,564, entitled METHODS AND DEVICES FOR IMPROVING THE MULTIPLE SPANNING TREE PROTOCOL, and Ser. No. 11/228,162, entitled SYSTEM AND METHOD FOR GENERATING SYMMETRICAL SPANNING TREES. Briefly, the techniques described therein (e.g., "optimal bridging") define a means for creating multiple spanning trees where each bridge of the network is the root of its own multiple spanning tree instance (MSTI) and where each Bridge identifier (ID) is used as the VID for the spanning tree. Each of the multiple spanning trees is symmetrical between bridges of the network, i.e., the spanning tree path from a first bridge (Bridge A) to a second bridge (e.g., Bridge F) is the same (in reverse) as the spanning tree path from the second bridge to the first bridge.

Referring again to FIG. 1, assume that each Bridge ID is the letter within the bridge 104 (e.g., A-F) and, as such, that the VID corresponding to each spanning tree instance is A-F. As those skilled in the art will understand, the smaller circles located near the ports 110 of the bridges 104 correspond to "blocked" spanning trees, or blocked VIDs is on that port. For example, from Bridge A, on "A's spanning tree" (the spanning tree for which Bridge A is a root), it can be seen that A can reach bridges B, C, and D directly, i.e., there are no ports blocking A's spanning tree between the bridges. Also, Bridge F may be reached via Bridge B, and Bridge E may be reached via Bridge D. Once any data is sent beyond Bridges C and E, Bridge F's ports (with the "A" in a circle) block the reception of the data marked with A's VID. Also, once data reaches Bridge F (i.e., from Bridge B), the data does not return to any other bridge (B, C, or E), thus preventing loops in accordance with the spanning tree protocol. Notably, Bridge A's spanning tree is "symmetrical" with Bridge F's spanning tree, such that Bridge A and F both reach each other through Bridge B (the bold lines, 106). The remaining bridges 104 also have their own optimal spanning trees (i.e., with each bridge as the root of its own spanning tree), and those skilled in the art will understand by looking at FIG. 1 that each tree is symmetrical and loop free accordingly as shown.

In accordance with the present invention, the entry bridge (Bridge A) determines a utilized (registered) BW on each LAN (segment) of the spanning trees. For example, various link state protocols may be used to learn the capabilities of the LANs (links/segments), such as a maximum BW of the LANs, etc. Example link state protocols that may be used with the present invention include, inter alia, the Open Shortest Path First (OSPF) protocol, the Intermediate-System-to-Intermediate-System (IS-IS) protocol, etc., as will be understood by those skilled in the art. Illustratively, the link state protocols may advertise "bridge-to-VID" assignments, designating the Bridge ID to be used for each of the multiple spanning tree VID values, as used herein. Because each of the Bridges A-F of the network 100 receives registration messages 400 from each other bridge, each bridge may be aware of all of the current registrations within the network. For example, as described herein, resource (e.g., BW) registrations may be received at a bridge (e.g., the entry bridge) from other bridges in the network. As those registrations are received, the entry bridge may determine and store their values and registered locations, e.g., in memory 218. Armed with knowledge of the link state information (e.g., maximum BW of the LANs) as well as the registered information (e.g., reserved/registered BW for the LANs), each bridge of the network may accordingly determine the amount of resources available (not reserved) at each location within the network.

Upon receiving a request to initiate BW registration for a data flow to a destination end point, e.g., from an application source end point 102A, the entry bridge (Bridge A) selects a spanning tree path to utilize for the data flow. In particular, the source end point 102A may generate a Resource ReServation Protocol (RSVP) message to request reserved resources, as will be understood by those skilled in the art. The entry bridge (A) may detect the RSVP message by examining messages received on UNI ports 111, and in response, may begin the registration process described herein. Notably, the application source end point 102A may also be configured to explicitly request a registration from the entry bridge; however, one benefit of the present invention (as will be appreciated by those skilled in the art) is the "plug and play" ability of not having to configure the source end points to operate differently than conventional operations.

Notably, the present invention utilizes the MSTIs rooted at each bridge and the forwarding of the data (e.g., data flow frames 500 and registration messages 400) based on a particular VID (i.e., a particular spanning tree). One aspect of the present invention, therefore, is the added ability to forward frames at an entry bridge from a source address to a destination address based on a spanning tree rooted at another bridge in the network (i.e., not necessarily the spanning tree rooted at the entry bridge). Similar to "source routing," the present invention allows for "alternate spanning tree paths" (or "options") to reach a destination end point (120F), while still maintaining the advantages of the spanning tree protocol.

Figure 6A:
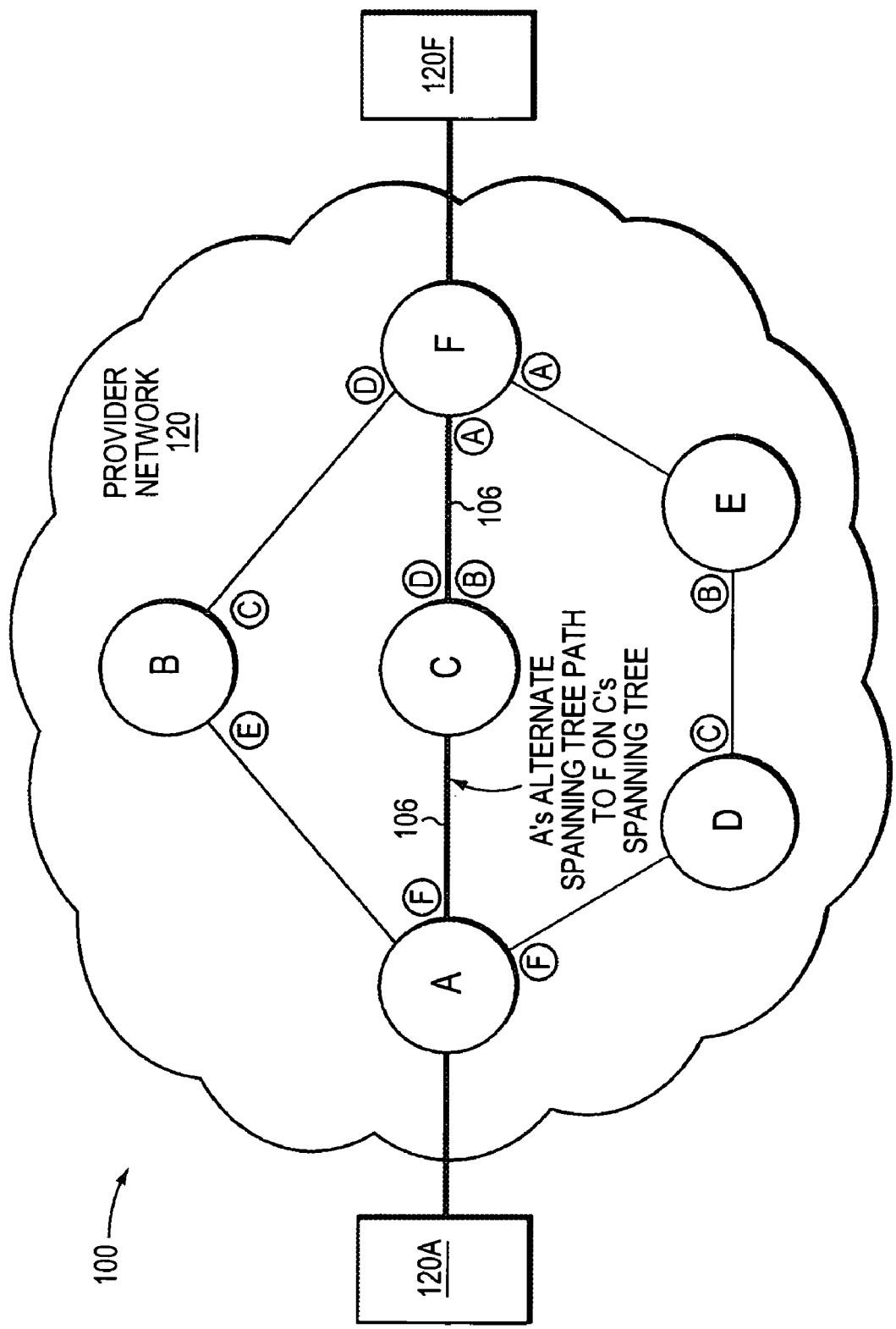
FIGS. 6A and 6B are highly schematic illustrations of the computer network as in FIG. 1 showing alternate spanning tree paths in accordance with the present invention.
Figure 6B:
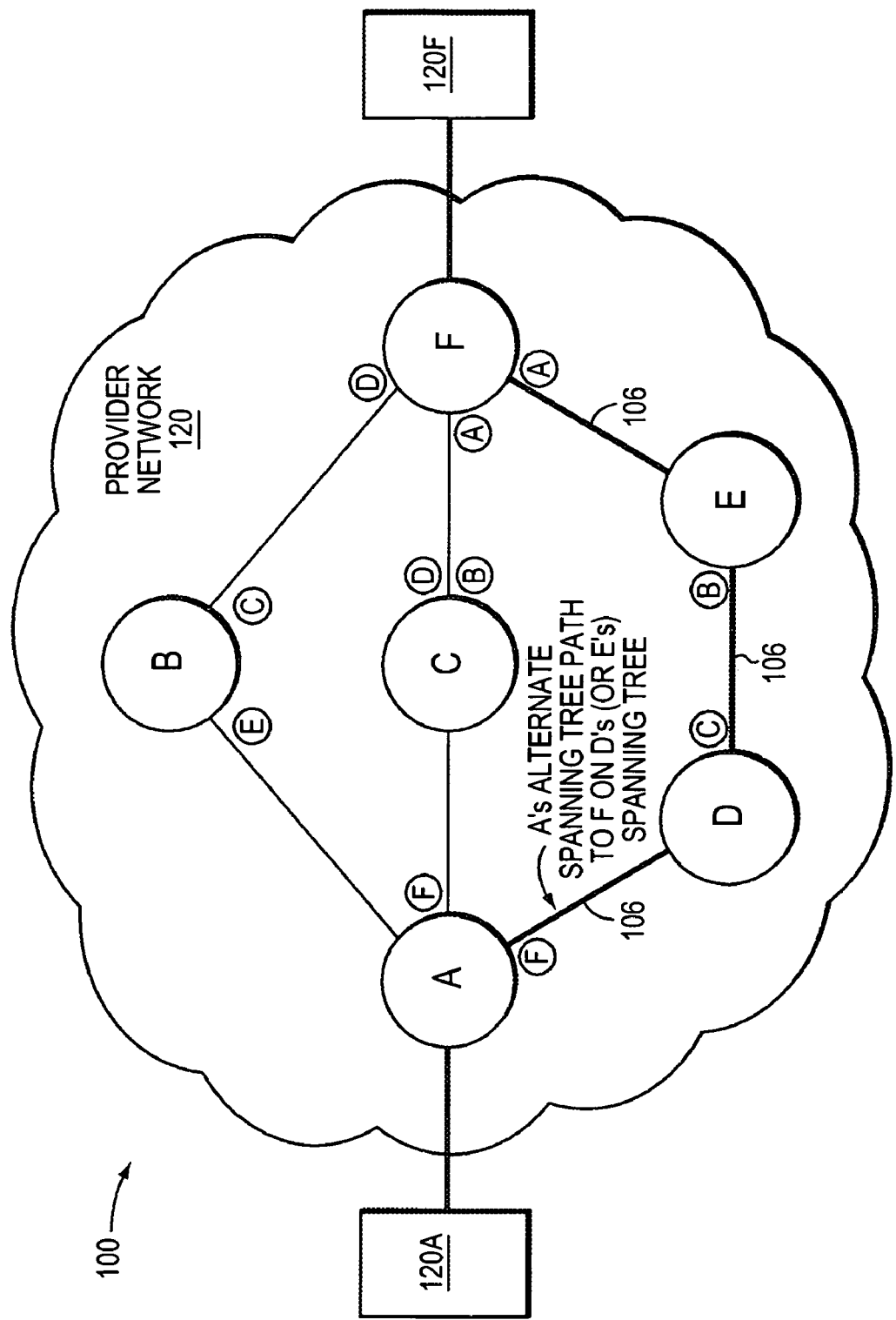

To illustrate, FIGS. 6A and 6B are highly schematic illustrations of the computer network 100 as in FIG. 1 showing alternate spanning tree paths in accordance with the present invention. For instance, conventionally, Bridge A (the entry bridge for source 120A) would only be able to reach Bridge F (the exit bridge for destination 120F) using A's spanning tree (a "primary spanning tree"). However, as shown in FIG. 6A, if Bridge A forwards frames based on Bridge C's spanning tree, the "alternate spanning tree" from Bridge A to C to F becomes available to Bridge A. In other words, Bridge F would normally block data from Bridge A on the port interconnected to Bridge C, i.e., based on the is VID of A's spanning tree in the data messages. However, now that Bridge A is able to insert Bridge C's spanning tree VID into the data messages (e.g., into VID field 512), Bridge F will no longer block the data, since Bridge C is not blocked on Bridge F's port. FIG. 6B shows another alternate spanning tree path for Bridge A to reach Bridge F, namely, by using Bridge D's (or E's) spanning tree.

To determine which spanning tree to utilize (e.g., primary or alternate), the entry bridge (A) may first determine the set of spanning tree paths to the destination (exit bridge) that have available resources for the registration. For example, assume that the RSVP message from the source end point 102A requests 10 Mb/s. The entry bridge, therefore, examines the contents of information provided by the link state protocols in memory 218 (e.g., in a link state database, LSDB, not shown) to determine the amount of BW originally available on each LAN (link/segment) of the network. Then, by examining the information stored regarding received BW registrations (e.g., as described herein), the entry bridge may determine the remaining available BW at each LAN of each possible spanning tree path to the destination. If any LAN (link/segment) along a path does not meet the resource requirements (e.g., including latency, loss, delay, etc., as requested in the RSVP message), that particular spanning tree path is not selected.

Upon determining which spanning tree paths are available for selection, the entry bridge determines which available spanning tree path is the best option, e.g., based on one or more metrics. Note that, in the event only a single spanning tree path is available based on resource requirements, that spanning tree is selected. Otherwise, the spanning tree with the lowest cost or distance (or any other metric, as configured by a system administrator) may be a determining factor as to which spanning tree path is the best (e.g., "shortest") to reach the destination (exit bridge). In the event that more than one spanning tree path shares the best metric (e.g., a "tie"), the entry bridge may utilize any method to select one of the spanning tree paths, such as, illustratively, the spanning tree path with the lowest bridge ID (and hence VID) as the root.

In the event the selected spanning tree path is not rooted at the entry bridge, i.e., is not on a primary spanning tree but rather an alternate spanning tree, bridges along the path may utilize special forwarding, i.e., separate and apart from conventional forwarding. Specifically, those skilled in the art will understand that by forwarding messages (e.g., registration messages 400 or data flow frames 500), the bridges 104 of the network 100 may incorrectly learn forwarding of source and destination MAC address traffic ("MAC address learning"). For example, according to primary spanning tree forwarding, Bridge F has learned that traffic from Bridge A will arrive and leave from the same port 110 toward Bridge B. However, if Bridge F receives traffic from Bridge A (i.e., for a source MAC address of end point 102A) via Bridge C (e.g., Bridge C's spanning tree), then Bridge F may create two separate forwarding instances for the MAC address forwarding over C's spanning tree and (or instead of) A's spanning tree. It is advantageous, then, to utilize separate ("special") forwarding for alternate (symmetrical) spanning tree traffic in accordance with the present invention.

In order to indicate to the Bridges 104 of the network 100 that the selected spanning tree VID is an alternate spanning tree and not a primary spanning tree, various techniques may be used. For example, a certain priority level may be used for the traffic, special use of a group/individual bit may be defined, or a CEI/DEI bit usage (e.g., a new ethertype) may be utilized to separate the alternate spanning tree traffic from primary spanning tree traffic. However, each of the mentioned techniques may require configuration changes to the network 100. Accordingly, the present invention illustratively makes use of the VID itself. For example, the present invention may indicate primary or alternate spanning tree paths by setting or clearing the high order bit (e.g., of twelve bits) of the VID. The low order bits (e.g., the remaining eleven bits) may be used to specifically identify the bridge ID which is the root of the particular spanning tree. Each bridge 104 of the network may be assigned two VIDs, one from values 1 to 2047 (e.g., for eleven bits), and a second that is the first value plus 2048 (i.e., setting the high order bit). In this manner, a bridge 104 encountering the lower VIDs may be configured to utilize conventional forwarding (e.g., lookup and learn MAC addresses in a common FDB 220, as will be understood), and when encountering the higher VIDs may be configured to utilize the special forwarding described herein.

Special forwarding, as used herein, forwards traffic (registration traffic and/or data flow traffic) based on a lookup operation into a specific (e.g., separate) FDB 220 corresponding to the particular VID of the traffic. In one embodiment of the present invention, MAC address learning may be disabled for data flow traffic (described below) on all special forwarding VIDs. The MAC address learning in this embodiment takes place only during the transmission of registration messages 400. As registrations are received, the specific FDBs 220 are populated with learned MAC addresses corresponding to a particular VID (e.g., a separate FDB for each VID).

In an alternative embodiment of the present invention, MAC address learning from data flow traffic is not disabled, but specific circumstances are defined for such learning (e.g., for situations where non-reservation traffic may advantageously utilize alternate spanning trees in accordance with the present invention). For instance, multicast MAC address FDB entries (MAC address learning) may be supplied via the registration messages 400. (Notably, those skilled in the art will understand that this may also serve as GMRP, MGRP, IGMP registration as well.) Also, unicast MAC address learning may take place during registration (i.e., for reservation traffic, such as AVB), or during data flow frame 500 traffic (i.e., for reservation or non-reservation traffic). Notably, in the case of one-way unicast streams (no return traffic) for reservation traffic, to avoid continually flooding traffic over the entire selected spanning tree, the MAC address learning should take place during the registration message 400 distribution (i.e., which requires at least a temporary two-way communication to select "active ports," as described below). Moreover, one-way non-reservation traffic utilizing the alternate spanning tree paths as in the present invention should be avoided for the same reason (flooding), as well as because there is no associated registration message 400 from which the bridges may learn proper forwarding.

Those skilled in the art will appreciate that it is particularly advantageous to prevent continual flooding of reservation traffic along every LAN of a spanning tree (i.e., not just along the spanning tree path between the end points 102). Such flooding would prevent efficient operation of registration monitoring, since excess BW from the continual flooding may compromise the actual utilization of the LANs (108) of the network not along the path, and therefore be unknown to the entry bridges, causing disruption to reservation traffic in progress as well as hindering the operation of the path selection technique described herein. Accordingly, MAC address learning should be available to alternate path traffic as described herein.

Notably, in an illustrative embodiment of the present invention, all reservation traffic (e.g., all AVB traffic) utilizes alternate spanning tree path VIDs, i.e., including traffic utilizing the primary spanning tree of the entry bridge. In this way, any reservation traffic that would utilize the primary spanning tree path (e.g., from Bridge A to Bridge F via Bridge B) would utilize an "alternate spanning tree path" (of Bridge A's second VID) that is the same physical path (i.e., via Bridge B).

Once the particular spanning tree path is selected, the entry bridge sends a registration message 400 for the data flow towards the destination end point along the selected spanning tree path, e.g., using the VID of the selected spanning tree. Illustratively, bandwidth registration (reservation) among the bridges 104 of the network 100 is described in detail in commonly-owned copending U.S. patent application Ser. No. 11/431,429, as incorporated above. According to the technique described therein, the amount of BW required for a given service is determined for each port of the provider network in a dynamic manner, e.g., a "dynamic bandwidth control" technique. Each bridge 104 having a UNI port 111 (e.g., the entry bridge A) of a service generates a registration that carries maximum BW values for the service using registration messages 400 (e.g., GARP, MRP, etc.) in response to a received reservation request from a customer 102A (e.g., using RSVP, as described above). The registration carries maximum BW values for each port direction in the corresponding attribute fields of FIG. 4 above, e.g., according to the requested reservation and/or a service level agreement (SLA). The registrations 400 are advertised (distributed) among neighboring bridges throughout the network toward other UNI ports 111 of the service (and, notably, no further). Notably, any bridge ports 110 receiving registrations from both directions (i.e., ports on a utilized spanning tree path) are "active ports" and, thus, allocate (reserve) BW for the particular service data flow accordingly (e.g., the same flow as the RSVP "flow specification" of the requested service). Otherwise, the port merely receives or advertises registrations in one direction, but not on the direct path (active spanning tree LANs 106) between any of the end points (102A and 102F), as will be understood by those skilled in the art.

Any failures detected along the path of the registration message 400 are signaled in the forward direction. In other words, the registration message 400 is marked with a "failure" indication (e.g., a bit or flag) at the bridge that determines the failure, and the registration continues from bridge to bridge. However, those skilled in the art will appreciate that because the present invention illustratively sends registrations over spanning tree paths based on an indication of success (e.g., from the link state protocol and registration monitoring), further failures may be caused by topology changes or request collisions (i.e., where two entry bridges attempt to register available BW simultaneously). Notably, a "connectivity priority" (also described in U.S. patent application Ser. No. 11/431,429 may be used to determine which colliding request should be granted the reservation. For example, bridges (e.g., AVB bridges) may have internal clocks that synchronize with other bridge clocks of the network. Accordingly, using a time of registration generation at the entry bridge for the connectivity priority may help determine which bridge requested the resources first and, as such, may be granted the reserved resources. Other priority-based schemes may be used in accordance with the present invention, as will be understood by those skilled in the art. Also, in the event the required resources are not available (e.g., falsely advertised capabilities, other unknown utilizations of resources, etc.), the attempted registration may also fail. When a bridge receives a failed registration, it propagates that registration as for a successful registration, but with the failed indication, and it allocates no resources for the corresponding data stream. When a bridge receives a failed registration that corresponds (in the other direction) to a registration originated by that receiving bridge, the bridge withdraws its registration.

A registration is successful when an entry bridge (Bridge A) receives returned registration messages 400 from each of the corresponding exit bridges (Bridge F). Conversely, the registration fails if any other exit bridge returns a failed registration message 400, and the registration is withdrawn by the entry bridge accordingly.

If the registration is successful, the data flow is transmitted on the selected spanning tree path accordingly (i.e., based on the VID instance in a specific FDB 220 as described above). For instance, the entry bridge (Bridge A) may inform/instruct the source end point 102A of which spanning tree to use, e.g., using the particular VID. As such, the source may include the VID in the data flow frames 500 in VID field 512. Alternatively, the entry bridge may not inform the source end point of which spanning tree to utilize, but may instead detect the particular data flow and place the traffic on the selected spanning tree itself. That is, the entry bridge (A) may utilize a VLAN selection protocol (e.g., as in IEEE 802.1v, now incorporated within IEEE 802.1D-2004) to apply an appropriate VID (and priority, etc.) to the data flows received from the source end point 102A in response to destination MAC addresses, etc., as will be understood by those skilled in the art. By inserting the VID into the VID field 512 of the data flow frames 500, the present invention keeps flow identification at the edge of the network, thus alleviating the requirement to do so from the interior of the network (e.g., so each bridge does not have to perform a VID lookup operation based on the flow to determine which spanning tree to utilize).

Upon completion of the application service data flow, the entry bridge may withdraw the registration, and thus unreserve the resources (e.g., BW), making the resources available for future data flows in accordance with the present invention. In the event the registration fails, the entry bridge (Bridge A) selects a next best alternate spanning tree in the same manner as described above (except without the failed spanning tree path as an option). For instance, instead of using Bridge C's spanning tree, the entry bridge A may use Bridge D's (or E's) spanning tree, assuming adequate resources. The entry bridge may continue to attempt next-best alternate spanning tree paths in this manner until a successful registration has been made for the data flow, or until there are no remaining alternate spanning tree paths that have sufficient resources for the registration. In this event, the entry bridge may be configured to return an error message to the source end point (102A) indicating as such.

Figure 7:
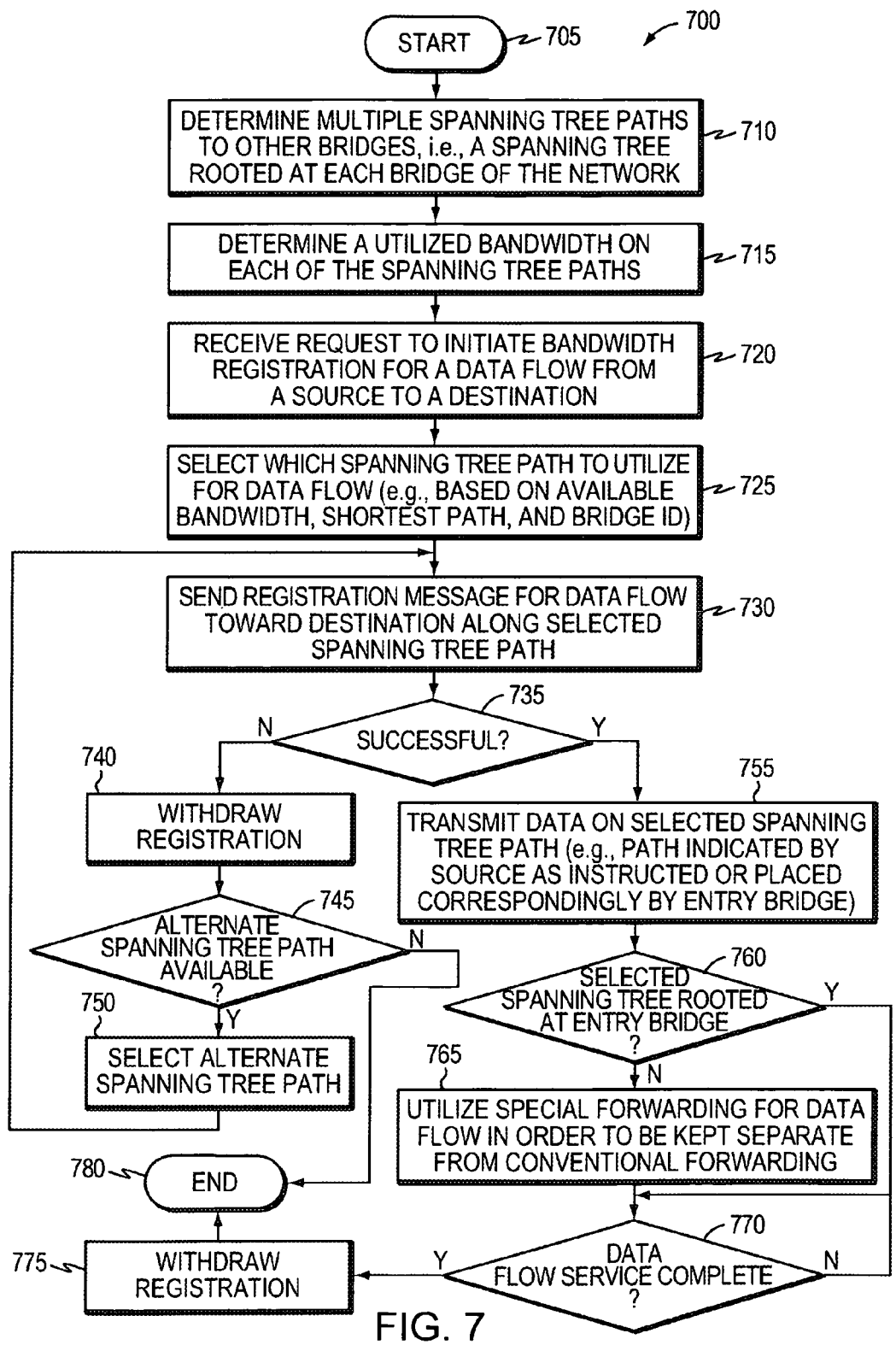
FIG. 7 is a flowchart illustrating a procedure for efficiently managing BW registration for multiple spanning tree options in accordance with the present invention.

FIG. 7 is a flowchart illustrating a procedure for efficiently managing BW registration for multiple spanning tree options in accordance with the present invention. The procedure 700 starts at step 705, and continues to step 710, where an entry bridge (e.g., Bridge A) determines multiple spanning tree paths to other bridges of the network (e.g., bridges B-F) in accordance with the technique described above. For instance, within the computer network 100, each bridge is configured as the root of a spanning tree, of which the entry bridge (A) is aware. At step 715, the entry bridge determines a utilized (registered) BW of each of the spanning tree paths, such as through storing received registrations and using a link state protocol, as described above. The entry bridge receives, in step 720, a request to initiate BW registration for a data flow from a source end point (e.g., source 102A) to a destination end point (e.g., destination 102F). As mentioned above, a request to initiate registration may be an explicit request, or, illustratively, the detection of an RSVP reservation request message sent from the source. In response, the entry bridge selects which spanning tree path to utilize for the data flow in step 725. In particular, the entry bridge determines the best spanning tree path (e.g., shortest) that has sufficient bandwidth for the data flow and, in the event of equal metric spanning tree path options, the spanning tree with the lowest Bridge ID may be selected.

The entry bridge sends a registration message 400 for the data flow towards the destination 102F (i.e., toward the exit bridge, F). As described above, each bridge along the selected path receives the registration and may learn the MAC addresses and specific ports to use, e.g., in response to the specific VIDs for alternate spanning tree paths. If the registration is unsuccessful (i.e., a set failure flags is returned) in step 735, the registration is withdrawn in step 740, and the entry bridge determines whether an alternate spanning tree path is available that would meet the QoS (e.g., BW) constraints of the data flow in step 745. If not, the procedure 700 ends in step 780. However, if an alternate spanning tree path does exist in step 745, the entry bridge selects the alternate path in step 750, and the procedure 700 returns to step 730 to send a registration message 400 along the newly-selected path.

If the registration is successful (i.e., a set failure flags is not returned) in step 735 (e.g., due to the first selected path registration or subsequent registrations of alternate paths), the entry bridge transmits the received data for the data flow on the selected spanning tree path in step 755. Notably, each other bridge along the selected path also transmits the received data on the selected path, accordingly. As described above, the entry bridge may be explicitly informed of the selected path from the source end point 102A (i.e., as initially instructed to do so by the entry bridge), or the entry bridge may scan the data traffic to determine the data flow, and place the traffic on the corresponding spanning tree path to the destination (e.g., 102F). If the selected spanning tree is not rooted at the entry bridge (i.e., is an alternate spanning tree, not a primary spanning tree) at step 760, then the entry bridge (and subsequent bridges of the network) utilize special forwarding in step 765 for the data flow in order to be kept separate from conventional forwarding as described above (e.g., using the VID bit indication of alternate spanning trees).

(Notably, as in the alternative example described above, all reservation data flows may utilize the special forwarding, i.e., only using alternate spanning trees.) Whether the primary spanning tree is used or an alternate spanning tree is used, the data may continue to flow accordingly until the service is complete in step 770, at which time the entry bridge may withdraw the registrations for the service in step 775, and the procedure ends in step 780.

Advantageously, the novel technique efficiently manages BW registration for multiple spanning tree options in a computer network. By monitoring the BW utilization (registration) of multiple spanning tree paths, the novel technique allows an entry bridge to determine the best spanning tree to utilize when transmitting a data flow. In particular, by allowing the entry bridge to select any one of the available multiple spanning trees based on BW utilization, the present invention provides greater opportunity for an entry bridge to register BW for a data flow in the event a primary spanning tree rooted at the entry bridge is congested or otherwise unavailable. Also, the dynamic nature of the novel technique alleviates the need for cumbersome manual configuration, and does not require a master network BW allocation facility.

While there has been shown and described an illustrative embodiment that efficiently manages BW registration for multiple spanning tree options in a computer network, it is to be understood that various other adaptations and modifications may be made within the spirit and scope of the present invention. For example, the invention has been shown and described herein using bridges and or switches illustratively of an IEEE 802.1 network. However, the invention in its broader sense is not so limited, and may, in fact, be used with other Ethernet or Metro Area Networks (MANs), as will be understood by those skilled in the art. Also, although the novel technique has been illustratively described for use with Audio Video Bridging, any data flows utilizing reserved BW may also utilize the inventive technique set forth herein. Moreover, while the above description describes performing the technique with various registration protocols (GARP, MRP, etc.), the present invention may equally utilize any suitable registration protocol, as will also be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for use at an entry bridge for efficiently managing bandwidth (BW) registration for multiple spanning tree options in a computer network, the method comprising:

determining a spanning tree path rooted at each bridge of a plurality of bridges of the computer network, such that there is a spanning tree path per bridge of the computer network, each spanning tree path associated with a different virtual local area network (VLAN) identifier (VID) assigned to the respective bridge at which the spanning tree is rooted;

determining a registered BW on each of the spanning tree paths;

determining a remaining available BW on each of the spanning tree paths from the registered BW;

receiving a request to initiate BW registration for a data flow from a source end point to a destination end point; and, in response selecting one of the plurality of spanning tree paths associated with a particular VID to utilize for the data flow based on the remaining available BW on each of the spanning tree paths; and sending a registration message for the data flow toward the destination end point along the selected spanning tree path.

2. The method as in claim 1, wherein the step of selecting one of the plurality of spanning tree paths further comprises:
determining which spanning tree path to utilize based also on a metric of the spanning tree paths.

3. The method as in claim 2, further comprising:
determining that two or more spanning tree paths have sufficient remaining available bandwidth for the data flow, and that the two or more spanning tree paths have equal metrics; and selecting the one of the plurality of spanning tree paths to utilize for the data flow based on a bridge identifier (ID) for a bridge root for the two or more spanning tree paths having equal metrics.

4. The method as in claim 2, wherein the metric is a length of the spanning tree paths.

5. The method as in claim 1, further comprising:
determining that a registration is successful; and
transmitting the data flow on the selected spanning tree path.

6. The method as in claim 5, further comprising:
informing the source end point of the selected spanning tree to utilize for the data flow.

7. The method as in claim 5, further comprising:
detecting the data flow; and
placing traffic of the data flow on the selected spanning tree.

8. The method as in claim 1, further comprising:
determining that a registration is unsuccessful; and, in response
determining whether an alternate spanning tree path of the plurality of spanning tree paths may be utilized for the data flow; and, if so,
sending a registration message for the data flow toward the destination end point along the selected alternate spanning tree path.

9. The method as in claim 8, further comprising:
determining that the registration along the selected alternate spanning tree path is successful; and
transmitting the data flow on the selected alternate spanning tree path.

10. The method as in claim 8 further comprising:
performing the steps of the method of claim 8 until one of either a successful registration or determining that no further alternate spanning trees exist.

11. The method as in claim 1, further comprising:
using the particular VID to indicate which selected spanning tree path to utilize.

12. The method as in claim 1, further comprising:
determining that the selected spanning tree path is not rooted at the entry bridge; and utilizing a special forwarding to be kept separate from conventional forwarding of a spanning tree path that is rooted at the entry bridge.

13. A bridge for use with efficiently managing bandwidth (BW) registration for multiple spanning tree options in a computer network, the bridge comprising:
two or more network ports;
a processor coupled to the two or more ports and configured to execute software processes; and
a memory configured to store a BW management process executable by the processor, the BW management process configured to: i) determine a spanning tree path rooted at each bridge of a plurality of bridges of the computer network such that there is a spanning tree path per bridge of the computer network, each spanning tree path associated with a different virtual local area network (VLAN) identifier (VID) assigned to the respective bridge at which the spanning tree is rooted, ii) determine a registered BW on each of the spanning tree paths, iii) determine a remaining available BW on each of the spanning tree paths from the registered BW, iv) receive a request to initiate BW registration for a data flow from a source end point to a destination end point, v) in response, select one of the plurality of spanning tree paths associated with a particular VID to utilize for the data flow based on the remaining available BW on each of the spanning tree paths.

14. The bridge as in claim 13, wherein the BW management process is configured to select one of the plurality of spanning tree paths to utilize for the data flow based also on a metric for the spanning tree paths.

15. The bridge as in claim 13, wherein the BW management process is further configured to determine that two or more spanning tree paths have sufficient remaining available bandwidth for the data flow, and to select the one of the plurality of spanning tree paths to utilize for the data flow from the two or more spanning tree paths based on a bridge identifier (ID) for a bridge root for the two or more spanning tree paths.

16. The bridge as in claim 13, wherein the BW management process is further configured to determine that a registration is successful, and transmit the data flow on the selected spanning tree path.

17. The bridge as in claim 16, wherein the BW management process is further configured to inform the source end point of the selected spanning tree to utilize for the data flow.

18. The bridge as in claim 13, wherein the BW management process is further configured to determine that a registration is unsuccessful, and, in response, determine whether an alternate spanning tree path of the plurality of spanning tree paths may be utilized for the data flow, and, if so, send a registration message for the data flow toward the destination end point along the selected alternate spanning tree path.

19. The bridge as in claim 18, wherein the BW management process is further configured to determine that the registration along the selected alternate spanning tree path is successful, and to transmit the data flow on the selected alternate spanning tree path.

20. The bridge as in claim 13, wherein the BW management process is further configured to send a registration message for the data flow toward the destination end point along the selected spanning tree path.

21. An apparatus for use at an entry bridge for efficiently managing bandwidth (BW) registration for multiple spanning tree options in a computer network, the apparatus comprising:
means for determining a spanning tree path rooted at each bridge of a plurality of bridges of the computer network, such that there is a spanning tree path per bridge of the computer network, each spanning tree path associated with a different virtual local area network (VLAN) identifier (VID) assigned to the respective bridge at which the spanning tree is rooted;

means for determining a registered BW on each of the spanning tree paths;

means for determining a remaining available BW on each of the spanning tree paths from the registered BW;

means for receiving a request to initiate BW registration for a data flow from a source end point to a destination end point; and means for selecting one of the plurality of spanning tree paths associated with a particular VID to utilize for the data flow based on the remaining available BW on each of the spanning tree paths, in response to receiving the request to initiate BW registration for the data flow.

22. A non-transitory computer readable medium containing executable program instructions for efficiently managing bandwidth (BW) registration for multiple spanning tree options in a computer network, the computer readable medium adapted for execution on an entry bridge of the network, the executable program instructions comprising program instructions for:

determining a spanning tree path rooted at each bridge of a plurality of bridges of the computer network that has a spanning tree path per bridge of the computer network, each spanning tree path associated with a different virtual local area network (VLAN) identifier (VID) assigned to the respective bridge at which the spanning tree is rooted;

determining a registered BW on each of the spanning tree paths;

determining a remaining available BW on each of the spanning tree paths from the registered BW;

receiving a request to initiate BW registration for a data flow from a source end point to a destination end point; and, in response selecting one of the plurality of spanning tree paths associated with a particular VID to utilize for the data flow based on the remaining available BW on each of the spanning tree paths; and sending a registration message for the data flow toward the destination end point along the selected spanning tree path.

* * * * *

UNITED STATES PATENT AND TRADEMARK OFFICE
CERTIFICATE OF CORRECTION

| | | |
|---|---|---|
| PATENT NO. | : 8,144,577 B2 | Page 1 of 1 |
| APPLICATION NO. | : 11/431428 | |
| DATED | : March 27, 2012 | |
| INVENTOR(S) | : Norman W. Finn | |

It is certified that error appears in the above-identified patent and that said Letters Patent is hereby corrected as shown below:

Col. 12, line 13 should read: "received at a port is that is in the forwarding spanning tree"

Col. 14, line 8 should read : ""blocked" spanning trees, or blocked VIDs is on that port. For"

Col. 15, line 26 should read: "connected to Bridge C, i.e., based on the is VID of A's"

Signed and Sealed this
Eighth Day of May, 2012

David J. Kappos
*Director of the United States Patent and Trademark Office*